United States Patent [19]

Botsch et al.

[11] Patent Number: 4,779,719
[45] Date of Patent: Oct. 25, 1988

[54] LIFTING DEVICE WITH A HIGHER SPEED IN THE DOWNWARD MOVEMENT AREA THAN IN THE UPWARD MOVEMENT AREA

[75] Inventors: Bertram Botsch, Karlsruhe; Werner Marzluf, Rheinstetten, both of Fed. Rep. of Germany

[73] Assignee: Maschinenfabrik Hellmut Geiger GmbH & Co., Karlsruhe, Fed. Rep. of Germany

[21] Appl. No.: 64,091

[22] Filed: Jun. 18, 1987

[30] Foreign Application Priority Data

Jun. 20, 1985 [DE] Fed. Rep. of Germany ....... 3620714

[51] Int. Cl.⁴ ............................................. B65G 25/00
[52] U.S. Cl. ................... 198/855; 198/468.6; 198/509; 198/701; 210/154; 187/119; 187/120
[58] Field of Search ............... 198/468.6, 468.8, 509, 198/701, 703, 706, 855, 856; 414/133, 143, 144, 168, 171, 178, 594; 318/332; 187/119, 120; 210/154, 160

[56] References Cited

U.S. PATENT DOCUMENTS

| | | | |
|---|---|---|---|
| 1,103,616 | 7/1914 | Noelle | 198/706 |
| 1,906,036 | 4/1933 | Wunderlich | 198/468.6 |
| 2,670,957 | 3/1954 | Ernst | 198/468.6 |
| 3,131,801 | 5/1964 | Marchetti | 198/468.6 |
| 4,265,360 | 5/1981 | Khodos | 198/468.6 |

OTHER PUBLICATIONS

Kümmel, Fritz, "Elektrische Antriebstechnik", Diagram 1.17, and text, (1971).
Hütte, "Electrotechnik", p. 284 (1957).
Elektro-Anzeiger, No. 16, Aug. 25, 1965, p. 35.

*Primary Examiner*—Joseph E. Valenza
*Attorney, Agent, or Firm*—Marmorek, Guttman & Rubenstein

[57] ABSTRACT

Lifting device with a higher speed in the downward movement area than in the upward movement area, equipped with a driving motor with brake, a gear and a load pick-up system, which runs on an oval or circular or loop-shaped race via a lower and an upper reversion device and which takes up the load in the lower area and delivers it in the upper area. A driving motor is used whose characteristic of torque versus rotation runs relatively flat and whose number of rotations in the downward movement area is in the ratio of at least 1.5:1 compared to the number of rotations in the upward movement area.

5 Claims, 1 Drawing Sheet

LIFTING DEVICE WITH A HIGHER SPEED IN THE DOWNWARD MOVEMENT AREA THAN IN THE UPWARD MOVEMENT AREA

BACKGROUND OF THE INVENTION

This invention relates to a lifting device with a higher speed in the downward movement area than in the upward movement area.

Lifting devices which pick up a load from a take-up zone and carry the load upward to a delivery area are well known in the art. Many of these devices include a load pick-up system which runs on an oval, circular, or loop-shaped track equipped with an upper and lower reversion device. The lifting device is driven by a driving motor and a gear. In addition, a brake is often provided which can stop the movement of the lifting device in the event of a power failure or an emergency stop.

It is well known in the art to use a "squirrel-cage" motor in the drive system. In a lifting device using such a conventional squirrel-cage motor, the driving speed is determined according to the permissible lifting speed under a load condition. When the drive system is working uniformly, th driving speed of the lifting device during its upward movement, i.e., when a load is being carried, is equal to that during its downward movement without a load.

It is preferable, however, for the downward movement of the lifting device to occur at a faster speed than the upward movement (the speed of which is limited by the load), thereby reducing the time of the lifting cycle.

Speed control of th conventional squirrel-cage motors has been accomplished in a number of ways. One such method is pole-changing, or altering the number of effective poles by regrouping the stator coils. Another method is frequency control, whereby the frequency of the power supply is varied by a control element. Yet another method accomplishes this objective by gear shifts.

The controlled speed adjustment thereby attained by these prior art methods referred to above is unfavorable because it is accomplished by a rigid, specified system which can only function by means of corresponding switching and control elements.

It is therefore an object of the present invention to provide a lifting device which reduces the time of the lifting cycle while avoiding the disadvantages of the change-over which is necessary in known devices.

It is another object of the present invention to provide a lifting device in which a speed is automatically achieved during the downward movement of the lifting device substantially caused by the weight of the load pick-up system acting a the driving power.

It is yet another objective of the present invention to provide a lifting system in which the speed of the upward movement of the lifting device is dependent upon the actual existing load.

SUMMARY OF THE INVENTION

These and other objects of the present invention are met by using a driving motor employing a rotating magnetic field whose graphical characteristic of torque versus rotation runs comparatively flat as compared to conventional squirrel-cage motors, at least in the area between half and complete synchronous number of rotations, and whose number of rotations in the downward movement area without the presence of a load is in the ratio of at least 1.5:1 as compared to the number of rotations in the upward movement area when a load is carried.

Driving motors have been developed from standard three-phase motors which incorporate special stator windings and a magnetically resistant rotor. Driving motors of this type normally supply torque at standstill or at any partial speed. In other words, these driving motors are used in the range of a rotation of 0, from which results the designation "magnet". In this range, the graphical characteristic of torque versus rotation produces a nearly horizontal line. In this way, the driving motor effects the moment of standstill in the way of a magnet or spring, with constant tension and an indefinitely large stroke. Maximum torque is supplied at standstill.

Driving motors such as the torque motor referred to above are well known in the art. An example of such a torque motor is torque motor Model No. 112M 22-6 produced by Stephan-Werke GmBH & Co. of Stuttgart, West Germany.

In contrast to the conventional squirrel-cage motor, the driving motor employed in the present invention has no breakdown torque with a subsequent steep decreasing characteristic line but rather has a comparatively "flat" decreasing curve which decreases relatively slowly from the moment of standstill to the moment 0 at the synchronous number of rotations. The operating condition of the rotating magnetic field used as a motor is dependent on the load in such a way that the operating point flexibly moves to and fro on the characteristic line according to the actual load and is adjusted automatically.

It has been found that it is especially advantageous to use a driving motor with such a characteristic line that the number of rotations in the downward movement area are in the ratio of approximately 2:1 compared to those in the upward movement area under load.

In another preferred embodiment, the number of rotations of the driving motor in the downward movement area is higher than the synchronous number of rotations.

Through the use of the driving motor described in this invention, a speed is automatically achieved in the downward movement area which is virtually caused by the weight of the load pick-up system acting as a driver. In this situation, the motor is working in hypersynchronous fashion. On the other hand, in the upward movement area, the speed is adjusted in dependence on the actual existing load.

DETAILED DESCRIPTION OF THE PREFERRED EMBODIMENTS

Figure 1:
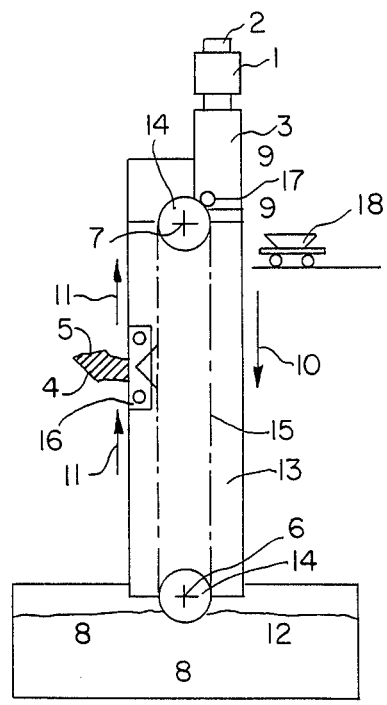
FIG. 1: a lateral view of a lifting device with a load pick-up system running on traction means.

FIG. 1 shows a lifting device with sprockets 14 supported in a stationary frame. Traction means 15 are led via the sprockets 14 which enable a conveyer lorry 16 equipped with a load pick-up system to run in an oval race. The traction means 15 are driven via the upper sprockets 14 whereby the drive is made via the driving motor 1, the gear 3 and the second gear 17. Driving motor 1 is a torque motor employing a rotating magnetic field of the kind previously described which supplies torque at standstill or at any partial speed. A brake 2 causes the required stopping of the lifting device in case of power failure or an emergency stop.

As depicted herein, the empty load pick-up system 4 is brought downwards within the downward movement area 10 and engages into the matter to be delivered 12 within the taking-up area 8, whereby the load pick-up system 4 is charged with the load 5. The load 5 is brought upwards within the upward movement area 11 and discharged into the upper taking-up device 18 within the delivering area 9.

Figure 2:
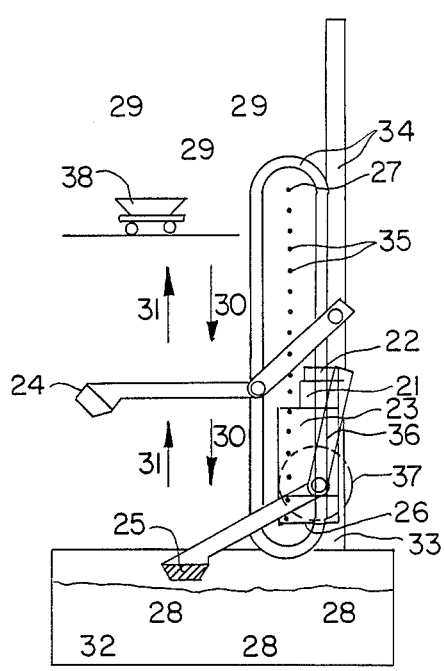
FIG. 2: a lateral view of a lifting device running up and down along a toothed rack.

FIG. 2 shows a similar lifting device where the conveyor lorry 36 with load pick-up system 24 also runs in an oval race. In this case, the drive unit comprising driving motor 21 and gear 23 is fixed to the conveyor lorry 36. Driving motor 21 is also a torque motor of the kind previously described. Conveyor lorry 36 is engaged into a stationary toothed rack 35 via a second gear 37. In this embodiment, the guiding tracks 34 are arranged so that the conveyor lorry 36 is deflected around the lower and upper reversion points 26 and 27 into the section of the guiding track situated on the opposite side respectively.

Also in this case, the empty load pick-up system 24 is brought to the lower taking-up area 28 within the downward movement area 30 and then brought to the upper delivery area 29 within the upward movement area 31 after it has been charged with the load 25 from the stock bin containing the goods to be delivered 32. There, the load is discharged to an upper taking-up device which, in this example, is suitably executed in a way to allow lateral shifting. After discharging the load 25, the load pick-up system 24 is transferred from the position within the upward movement are 31 into the position within the downward movement area 30.

For practical reasons, the drive unit is equipped with a brake 22 which will block the lifting device when necessary.

Figure 3:
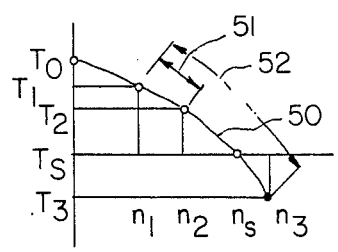
FIG. 3: a graphical representation of the characteristic of torque versus rotation according to the invention.

FIG. 3 shows a typical curve of the characteristic of torque versus rotation for the driving motor of the present invention. In this graph, the corresponding moments T are associated to different numbers of rotations n With the number of rotations 0, the standstill moment is $T_0$. In the range of numbers of rotations shown in the sketch, the moment decreases continually with increasing numbers of rotations. The moment becomes 0 in the synchronous range and negative in the hypersynchronous range. In the total field of action of the lifting device, the actual number of rotations will be automatically adjusted according to the actual load. Accordingly, $N_2, T_2$ are the number of rotations and torque for the empty load pick-up system in the upward movement area. $N_3, T_3$ are the number of rotations and torque in the downward movement area. $N_1, T_1$ represent the number of rotations and torque under load conditions in the upward movement area. Therefrom results the range 51 between n1 and n2 as the range of the number of rotations for the different load conditions, and the range 52 between the number of rotations n1 and n3 as the total range of the number of rotations for all the operating conditions of the lifting devices.

As depicted in FIG. 3, the characteristic line 50 runs "flat", i.e., has a relatively slow decreasing curve as compared to that provided by the conventional squirrel-cage motor within the range between half and total synchronous number of rotations ns.

Another advantage of the invention is an additional automatic adjustment of the driving system to the prevailing particularities in the taking-up area. In the taking-up area 8, 28 a higher force, moment or power is necessary for the procedure of scooping, digging, etc., than in the subsequent upward movement area 11, 31 because in the taking-up area additional forces for the tearing off, collecting and discharge of excessive material to be delivered must be made available. The taking-up area 8, 28 can therefore be considered as the region of highest strain. Due to the automatic transition from the higher number of rotations n along the characteristic line to n2 or n1, the motor still shows the higher rotative moment in the critical first phase during a few seconds, which is then decelerated.

Furthermore, during the travel within the downward movement area 10, 30, the motor achieves its lowest service temperature due to the increased number of rotations of the ventilator. The highest heating of the driving motor 1, 21 therefore occurs in a most favorable way during the lowest service temperature. The required power during travel in the upward movement area 11, 31 is smaller in comparison to the required power in the downward movement area and therefore, heating in the upward movement area is lower. For this reason, the drive unit can be decelerated much more at the place of its highest strain, i.e., within one complete cycle of motion even down to standstill for a few seconds by simultaneous generating of the highest driving moment, without resulting in dangerous overheating.

While the invention has been described by reference to specific embodiments, this was for purposes of illustration only and should not be construed to limit the spirit or the scope of the invention.

We claim:
1. A lifting device, comprising
a track defining a substantially oval-shaped path having a lower area and an upper area, said track including an upward movement zone and a downward movement zone,
conveying means attached to said track for conveying a load in said upward movement zone, said conveyor means receiving said load in said lower area and delivering said load in said upper area, and
driving means with a driving motor and a gear for moving said conveyor means along said oval-shaped path, said driving motor using a rotating field magnet which includes a torque versus rotation characteristic which has a relatively slowly decreasing curve in the area between half and complete synchronous number of rotations and which number of rotations in said downward movement zone is greater than the synchronous number of rotations.
2. The lifting device of claim 1, wherein the number of rotations of said driving means in said downward movement zone is in the ratio of at least 1.5:1 compared to the number of rotations in said upward movement zone.
3. The lifting device of claim 1, wherein said rotations ($N_3$) in said downward movement zone is in the ratio of approximately 2:1 compared to the number of rotations ($N_1$) in said upward movement zone.
4. The lifting device of claim 2, wherein said torque is negative in a hypersynchronous range of said driving means.
5. The lifting device of claim 3, wherein the speed of the downward movement of said conveying means is substantially caused by the weight of said conveying means.

* * * * *